H. B. MASSER.
ICE CREAM FREEZER.
No. 19,147.　　　　　　　　　　　　Patented Jan. 19, 1858.
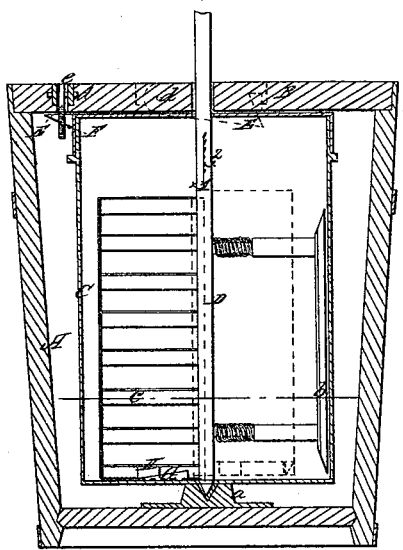
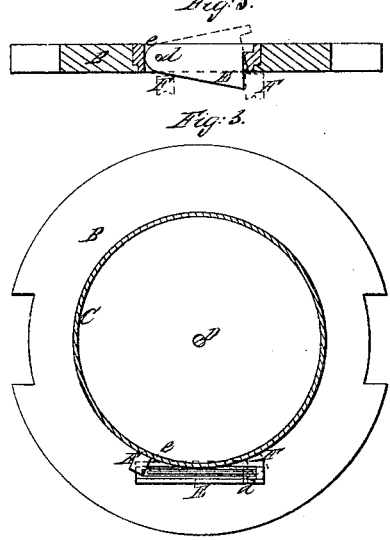
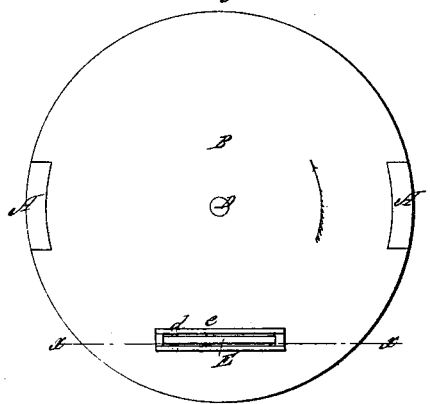
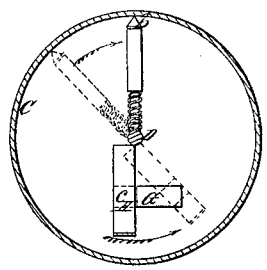

UNITED STATES PATENT OFFICE.

H. B. MASSER, OF SUNBURY, PENNSYLVANIA.

ICE-CREAM FREEZER.

Specification of Letters Patent No. 19,147, dated January 19, 1858.

*To all whom it may concern:*

Be it known that I, H. B. MASSER, of Sunbury, in the county of Northumberland and State of Pennsylvania, have invented a new and useful Improvement in Ice-Cream Freezers; and I do hereby declare that the following is a full, clear, and exact description of the same, reference being had to the accompanying drawings, forming part of this specification, in which—

Figure 1, is a vertical central section. Fig. 2, is a plan or top view. Fig. 3, is an inverted plan or top view. Fig. 4, is a horizontal section of the cream vessel and agitator. Fig. 5, is a vertical section in the line $x$ $x$ of Fig. 2, through the top of the ice vessel.

Similar letters of reference in each of the several figures indicate corresponding parts.

The object of my invention is to secure for the agitator and cream cylinder, when arranged on the same shaft, a revolution together, for a certain length of time, and at intervals, by simply reversing the motion of the shaft, a separate and independent revolution of the agitator or scraper.

The nature of my improvement consists in a beveled, pivoted, stop arranged on the ice vessel's top, and an inclined, or beveled, stop on the bottom of the cream cylinder, for operation in combination with an offset or projection on the upper edge of the cream cylinder, and one on the lower edge of the agitator or scraper, as presently set forth, whereby when the crank shaft which carries the agitator or scraper, and the cream cylinder, is turned in one direction the cylinder and agitator will turn together, and when turned in an opposite direction, simply the agitator will turn and scrape off the frozen cream which may have alhered to the sides of the cream cylinder.

To enable others skilled in the art to make and use my invention I will proceed to describe its construction and operation.

A, represents the outer ice vessel, made of wood. Its top B, is fastened down on it so as not to be capable of turning.

C, is the inner cream cylinder made of metal; it sits on and turns loosely in a metal box $a$, fastened firmly to the bottom of the vessel A.

D, is a vertical shaft passing loosely down through the top B, and resting and turning in a cone seat or box formed in the bottom of the cream cylinder. The shaft D, carries the scraper $b$, and agitator $c$.

The ice cream freezer thus far described is common; the novelty remaining to be specified.

E, is a beveled stop arranged and pivoted as at $d$, in a transverse slot $e$, cut through the top of the ice vessel A, as shown in Figs. 1, 2, 3 and 5.

F, is an off-set or projection on the upper outer edge of the cream cylinder. This offset operates in combination with the beveled stop E, in the manner presently stated.

G, is a beveled stop on the bottom of the cream freezer, and H, is an offset or projection on the lower edge of the agitator or scraper for operation in combination with the stop G.

Operation: The shaft D, is turned to the right or in the direction of the arrow 1 and in being thus turned the offset F, comes in contact with the beveled edge of the stop E, and slides past it by raising it to the position shown in red in Fig. 5. While this is occurring the offset H, is in contact with the vertical edge of the stop G, and consequently the scraper and agitator revolve with the cream cylinder. Now by turning the shaft to the left or in the direction of the arrow 2, the offset F, will come in contact with the vertical edge of the stop E, and be held stationary thereby while the offset H, will come in contact with the beveled surface of the stop G, and slide over it, and thus allow the scraper and agitator a chance to revolve independently of the cream cylinder.

My improvement is very essential in connection with ice cream freezers, as every few moments it becomes necessary to employ the scraper to remove the frozen cream adhering to the surface of the cylinder, and to do so it is essential that no shifting of parts be necessary as those engaged in the management of the freezer generally have no mechanical skill.

What I claim as my invention and desire to secure by Letters Patent, is—

The beveled pivoted stop E, arranged on the top of the ice vessel, and the beveled stop G, on the bottom of the cream cylinder, for operation in combination with the offset F, on the upper edge of the cream cylinder, and the offset G, on the lower edge of the agitator and scraper; substantially as and for the purposes herein set forth.

H. B. MASSER.

Witnesses:
JOHN S. HOLLINGSHEAD,
GOODWIN Y. AT LEE.